US010972524B1

(12) United States Patent
Chambers

(10) Patent No.: US 10,972,524 B1
(45) Date of Patent: Apr. 6, 2021

(54) CHAT BASED HIGHLIGHT ALGORITHM

(71) Applicant: Amazon Technologies, Inc., Seattle, WA (US)

(72) Inventor: Gregory Chambers, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 15/195,506

(22) Filed: Jun. 28, 2016

(51) Int. Cl.
*H04L 29/06* (2006.01)
*H04L 12/58* (2006.01)
*H04L 29/08* (2006.01)

(52) U.S. Cl.
CPC ............ *H04L 65/601* (2013.01); *H04L 51/02* (2013.01); *H04L 51/04* (2013.01); *H04L 65/607* (2013.01); *H04L 67/02* (2013.01)

(58) Field of Classification Search
CPC ...................... H04L 12/1822; H04L 65/403
See application file for complete search history.

(56) References Cited

U.S. PATENT DOCUMENTS

| | | | | |
|---|---|---|---|---|
| 2006/0015923 | A1* | 1/2006 | Chuah | H04N 21/235 725/135 |
| 2009/0132924 | A1* | 5/2009 | Vasa | G11B 27/105 715/723 |
| 2012/0214564 | A1* | 8/2012 | Barclay | G07F 17/3227 463/11 |
| 2014/0123014 | A1* | 5/2014 | Keen | H04L 51/046 715/719 |
| 2014/0173467 | A1* | 6/2014 | Clavel | H04L 12/1822 715/758 |
| 2014/0229866 | A1* | 8/2014 | Gottlieb | H04L 65/403 715/758 |
| 2014/0282111 | A1* | 9/2014 | Gurbag | H04L 65/403 715/756 |
| 2017/0257651 | A1* | 9/2017 | Zhu | H04N 21/2387 |

* cited by examiner

*Primary Examiner* — Philip J Chea
*Assistant Examiner* — Mohammed Ahmed
(74) *Attorney, Agent, or Firm* — Patterson + Sheridan, LLP

(57) ABSTRACT

Techniques are disclosed for identifying highlight segments of a media stream provided by a streaming platform. As disclosed, a highlight generation tool obtains a media stream and chat activity associated with the media stream. The highlight generation tool may identify segments in the media stream that exceed a baseline threshold of expected chat activity. The highlight generation tool creates one or more highlights from the identified segments.

20 Claims, 10 Drawing Sheets

CHAT BASED HIGHLIGHT ALGORITHM

Embodiments presented herein generally relate to streamed media. More specifically, embodiments presented herein provide techniques for identifying highlight segments in a large stream of media based on chat activity volume associated with the stream.

Many streaming platforms allow a user to broadcast media over a network in real-time. For example, a popular use of such streaming platforms is broadcasting video gaming to a wide viewing audience. That is, a stream owner may broadcast video game playthroughs, esports competitions, gaming-related talk shows, and the like, using a given streaming platform. Further, a viewer can access live streams through various methods, such as via a web browser on a computer, an app on a mobile phone, or platform-dedicated software on a gaming console. In addition, the streaming platform may include chat functionality, allowing viewers to interact with a stream owner in real-time, thus providing a robust user experience with stream owners and viewers alike.

A streaming platform may also temporarily archive past broadcasts for later access, such as for editing by the stream owner or for streaming on-demand by a viewer. Because a raw broadcast may run long—for many hours—a stream owner can edit a past broadcast to highlight relevant segments of the broadcast that might be of interest to a viewer, such that the broadcast is in a more easily digestible length, e.g., in minutes or tens of minutes. Using a video game playthrough as an example, the stream owner may want to include moments where the stream owner executed a successful desperation play against an opponent or encountered something in-game not ordinarily seen during routine playthroughs. The streaming platform may then make the edited highlights available to other viewers for streaming on-demand. This is advantageous for viewers who would rather view relevant portions of a playthrough than the entire raw broadcast, which, again, can run for many hours.

Currently, to create highlights from multiple segments of a past broadcast stream, the stream owner typically seeks through the raw stream footage manually to identify moments of interest in the stream. Generally this process is cumbersome, as the stream owner might not remember which points of the stream feature such moments. This is especially true for very long streams. As a result, the stream owner may be less inclined to create such highlights.

DETAILED DESCRIPTION

Figure 1:
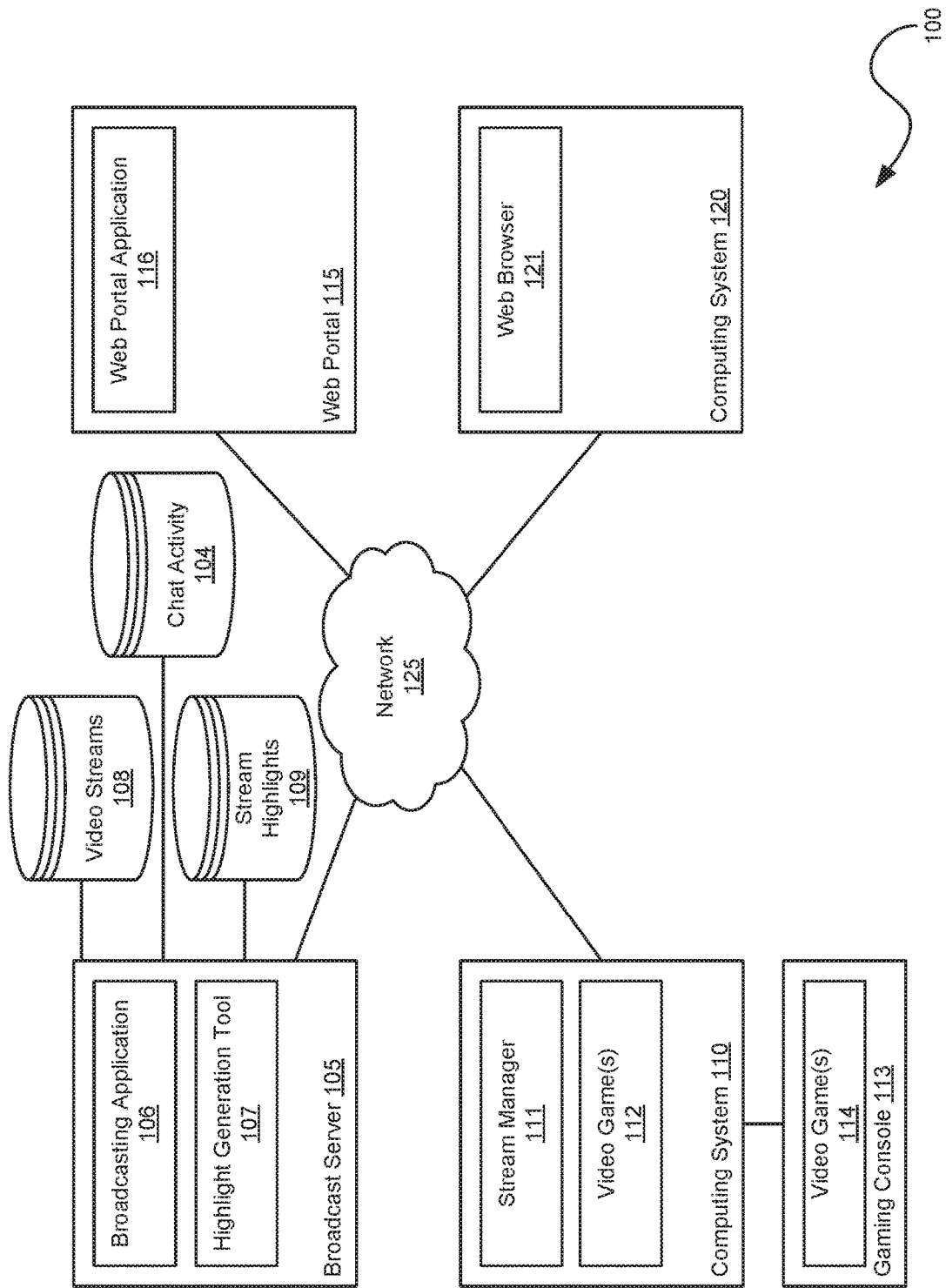
FIG. 1 illustrates an example of a computing environment providing a streaming platform for broadcasting streamed video over a network, according to one embodiment.

A streaming platform allows a stream owner to live-broadcast media (e.g., streaming video) over a network to a wide viewing audience. For example, the stream owner may broadcast video game activity, such as a playthrough of a video game, via a broadcast feed on the streaming platform. The streaming platform may also allow the stream owner to edit and save a past broadcast in post to highlight relevant content that may be interesting to a user of the streaming platform, such as a viewer of the broadcast. Further, the streaming platform may provide a chat interface which allows viewers to interact with the stream owner (and other viewers) in real-time as they watch the broadcast feed. For example, viewers may use the interface to react to in-game actions by the stream owner, e.g., expressing surprise at a certain play by the stream owner, directing the stream owner to perform an in-game command, etc.

As stated, a stream owner may archive a past broadcast that can be temporarily stored by the streaming platform. In some cases, the streaming platform may allow the stream owner to indefinitely store highlights of the past broadcast, e.g., moments of potential interest to a viewer. In such a case, the stream owner to select highlights of the broadcast, typically using some time marker specifying the beginning and end of each highlight. Doing so allows the stream owner to distill a long video stream to a relatively shorter video of highlights or multiple videos each focusing on a particular highlight.

Embodiments presented herein provide techniques for dynamically generating highlight segments in a large stream of media, e.g., a video stream, based on chat activity associated with the stream. An increase in chat activity while the broadcast is streaming can be correlated to a moment in the broadcast potentially interesting to someone watching. Continuing the example of a video game playthrough, chat activity may be relatively low during points in the feed that correspond to little or no action in-game. However, the chat activity may rise during some in-game event that provokes viewers to react via the chat interface, e.g., successful execution of a clutch play, unsuccessful execution of another play, unlocking an achievement, etc. Similarly, a significant decrease in chat activity may also correspond to a moment of potential interest for a viewer of the stream after some event has occurred, e.g., an event occurring within the video stream that causes viewers to suddenly disengage from the stream.

Techniques provide a highlight generation tool hosted by the streaming platform. In one embodiment, the highlight generation tool obtains a video stream and associated chat activity, e.g., by request of the owner of the video stream. The highlight generation tool correlates a number of chat messages for every point of time. In addition, the highlight generation tool determines a threshold of expected chat activity across the recorded video stream. For example, the highlight generation tool may establish the threshold as an average rate of chat activity per a specified time interval (e.g., every minute, every ten minutes, etc.) across an entire recorded video stream. Doing so allows the highlight generation tool to identify continuous points in time where the number of chat messages exceeds (or falls significantly below) the threshold. For instance, such points exceeding the average rate by a specified amount (e.g., by a standard of deviation measure) may correspond to a potential highlight in the stream. For each set of continuous points in time, the highlight generation tool may identify a peak point, i.e., a point where the number of chat messages is the largest in that set. As another example, the highlight generation tool may also identify a valley point for a set of continuous points that significantly falls below the threshold.

Further, the highlight generation tool may then identify a time window associated with that peak point. As will be further described below, the time window may be determined based on the pattern of the set of continuous points. For example, if the pattern is representative of a period during the stream where viewers react to something unexpected, the time window may begin at a time period prior to the peak point and prior to the rise in the curve (e.g., a minute before the peak point) and end at a larger time period following the peak point (e.g., two or three minutes after the peak point). As another example, if the pattern is representative of a period during the streams where viewers expect a significant event to occur, the time window may begin at a large time period prior to the peak point and at a smaller time period following the peak point.

In one embodiment, the time windows represent segments of the video stream that correspond to a potential highlight. In addition, the stream owner may adjust the identified time windows for a desired accuracy. In one embodiment, the highlight generation tool may refine time window determinations for subsequent video streams of the owner based on such adjustments. Once time windows are identified, the highlight generation tool may create a highlight video file that includes each of the segments for playback. In addition, the highlight generation tool may also create separate highlight video files, each corresponding to a given segment. Once created, the highlight generation tool may provide the video(s) for viewer access on the streaming platform.

Advantageously, this approach automatically identifies moments within a large media stream that may be of potential interest to users of the streaming platform, based on real-time engagement of viewers while the stream was broadcasted live. Further, this approach provides a solution for stream owners who would like to generate highlight videos for their (often very lengthy) past broadcast streams. That is, instead of manually sifting through a large amount of content in a past broadcast, the highlight generation tool identifies relevant segments in the past broadcast based on chat activity levels associated with those segments. Further still, this approach may also determine time windows to associate with each highlight segment based on a chat activity pattern, e.g., whether the pattern indicates that a given moment is anticipated or unexpected by viewers. As a result, an identified segment captures a highlight in the video stream with accuracy. In addition, adjustments to the time windows by the stream owner allows the highlight generation tool to further refine time window determinations in subsequent stream broadcasts by the stream owner.

Note, the following references a streaming platform generally used by a stream owner to broadcast video gaming (e.g., playthroughs, esports competitions, gaming-related talk shows, etc.) in real-time and archive for on-demand access. Such reference is used as an example streaming platform that may generate highlights of streamed media based on associated chat activity accompanying the stream. However, one of ordinary skill in the art will recognize that embodiments presented herein may be adapted for a variety of streaming media services. For example, embodiments may be adapted to an audio platform that allows users to comment on different portions of a given audio stream hosted on the platform (e.g., that may be uploaded by a music artist, stage performer, radio broadcaster, etc.). Techniques may identify peaks in the chat activity that exceed a baseline rate of activity by a specified variance measure (e.g., by one or two units of standard deviation) and further determine time windows of highlight segments of the audio stream based on those peaks.

FIG. 1 illustrates an example of a computing environment 100 providing a live streaming platform for broadcasting streamed video over a network, according to one embodiment. As shown, the computing environment 100 includes a broadcast server 105, a computing system 110, a web portal 115, and a computing system 120, each interconnected via a network 125 (e.g., the Internet). Computing systems 110 and 120 are representative of a variety of computing devices, including a desktop computer, laptop computer, mobile computer (e.g., a tablet or a smartphone), etc.

The live streaming platform allows a stream owner to broadcast live video to a wide audience of viewers. A stream manager 111 provides an interface for the stream owner to access the streaming platform and broadcast videos. In particular, the stream manager 111 is configured to capture video input of the stream owner from the computing system 110, e.g., as the stream owner plays one or more video games 112. Further, the computing system 110 may be connected with a gaming console 113 that includes one or more video game(s) 114. Doing so allows the stream manager 111 to capture video input from the gaming console 113. Alternatively, the gaming console 113 itself may include platform software to directly capture video input in real-time. The stream manager 111 sends video input in real-time to the broadcast server 105.

In one embodiment, the broadcast server 105 includes a broadcasting application 106, a highlight generation tool 107, video streams 108, chat activity 104, and stream highlights 109. The broadcast server 105 is a computing system executing as part of the streaming platform. In one embodiment, the broadcasting application 106 ingests video data sent by the stream manager 111, transcodes the video data into multiple streams (as video streams 108), and distributes the streams to geographically disparate nodes of a content delivery network (CDN) for on-demand access by users of the streaming platform. For example, a viewer may access the streaming platform via a web browser 121. In such a case, the web browser 121 accesses a web portal application 116 (provided by web portal 115), which directly interfaces with the broadcast server 105. The web portal application 116 allows a viewer to search for a particular broadcast feed or stream owner and view various video streams 108.

In one embodiment, the broadcasting application 106 provides a chat system that delivers messages to users watching a given video stream 108. The chat system may support a variety of protocols, such as Internet Relay Chat (IRC) as well as proprietary messaging protocols. Further still, the chat system receives and distributes messages between viewers watching the stream (as chat activity 104) and backend services using a given messaging protocol over a network communication protocol (e.g., TCP). In addition, the chat system manages metadata for the chat activity 104, e.g., viewer lists, membership data, mappings of chat messages to a point in time of the stream, chat activity statistics, and the like.

Generally, the broadcasting application 106 temporarily stores video streams 108 and chat activity 104 in a data store associated with the stream platform, e.g., up through fourteen days. However, the broadcasting application 106 allows a stream owner to save stream highlights 109 of a given video stream and chat activity 104 for an indefinite period of time in a stream platform data store. A stream highlight 109 includes one or more segments of a video stream 108 that may be of interest to a viewer. To do so, the stream owner may select segments of the video stream 108 via an interface for the stream manager 111 to include in a given stream highlight 109. As stated, this may be time-consuming for video streams 108 that have a relatively long running time.

In one embodiment, highlight generation tool 107 identifies segments for a given video stream 108 corresponding to highlights based on viewer engagement with the video stream 108. In particular, and as will be further described below, the highlight generation tool 107 evaluates the chat activity associated with a particular video stream 108. Chat activity 104 at a given period of time in a video stream 108 may indicate a level of viewer interest during that period of time. Therefore, segments of the video stream 108 associated with a relatively high level of chat activity 104 may correspond to highlight segments that may be included in a highlight video requested by the stream owner. Similarly, segments of the video stream 108 associated with an uncharacteristically low level of chat activity 104 (e.g., for the moment in time of the video stream 108) may also correspond to a segment of potential interest.

Figure 2:
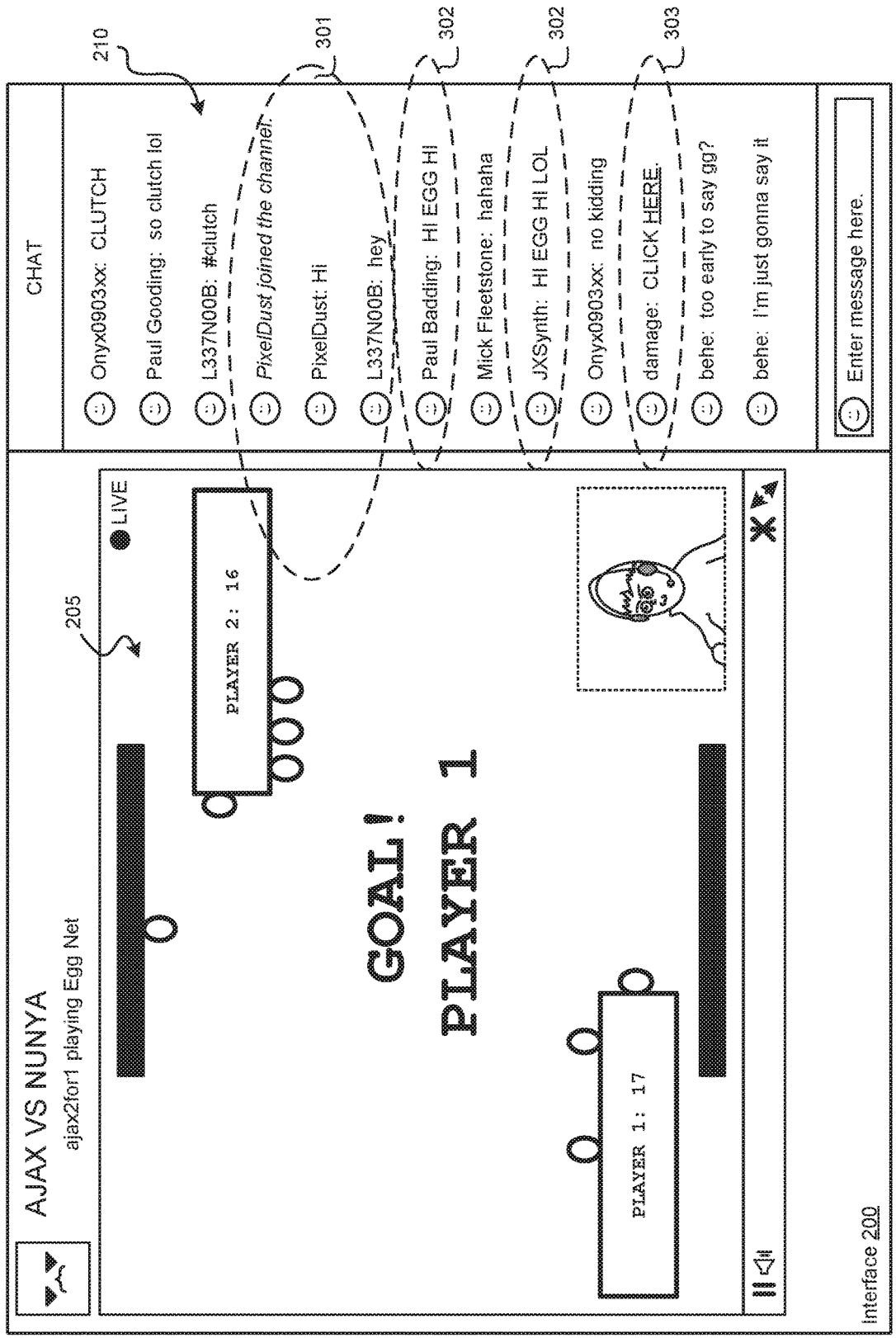
FIG. 2 illustrates an example of an interface used to view a video stream and input chat messages, according to one embodiment.

For instance, assume that a stream owner live-broadcasts a playthrough of a competitive video game. As a reference, FIG. 2 illustrates an example interface 200 provided by the streaming platform that allows a viewer to watch the broadcast. Here, the interface 200 presents a playthrough of a video game called "Egg Net" in a stream viewer 205 called "AJAX VS NUNYA" by a stream owner "ajax2for1." Illustratively, the stream viewer 205 presents a live feed of the playthrough for the viewers to watch in real-time.

Further, a chat interface 210 is situated adjacent to the stream viewer 205. The chat interface 210 allows the viewer to interact with other viewers in the chat channel for the video stream. For example, the viewer may react to something occurring in-game (as presented in the stream viewer 205), converse with other viewers in the chat channel, and interact with the stream owner (who may read the chat messages by the viewers in a separate interface). Illustratively, the viewers in the chat channel are generally reacting to a successful play executed by the stream owner in the competitive game, commenting on a "clutch" play by the stream owner. In the case that the volume of these chat messages exceeds an expected level, the chat messages may indicate that a highlight event is occurring in the stream.

At completion of the video stream 108, the stream owner may request an automatic generation of highlight videos. As stated, the highlight generation tool 107 may identify such events as the one described based on the level of chat activity 104. Consequently, measuring the chat activity 104 across the running time of the video stream 108 allows the highlight generation tool 107 to identify relevant segments in the video stream 108 corresponding to moments of potential interest to a viewer.

Figure 3:
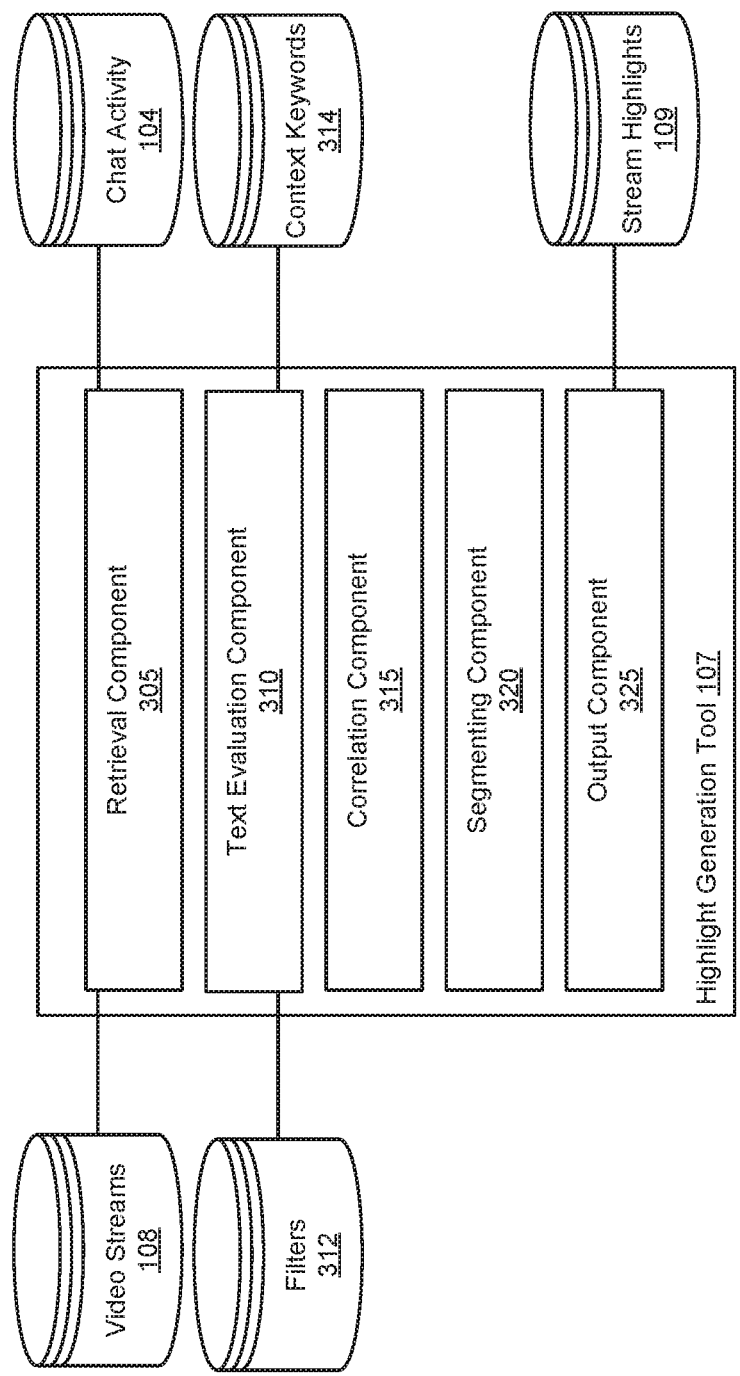
FIG. 3 further illustrates the highlight generator described relative to FIG. 1, according to one embodiment.

FIG. 3 further illustrates the highlight generation tool 107 configured to identify segments of a video stream 108 based on a level of chat activity 104 corresponding to the stream, according to one embodiment. As shown, the highlight generation tool 107 includes a retrieval component 305, a text evaluation component 310, filters 312, context keywords 314, a correlation component 315, a segmenting component 320, and an output component 325.

In one embodiment, the retrieval component 305 obtains a video stream 108 from the data store. For example, the video stream 108 may be a completed video stream obtained in response to a request of the stream owner to the highlight generation tool 107. In addition, the retrieval component 305 obtains chat activity 104 associated with that video stream. As stated, the chat activity 104 includes a distribution of chat messages across the running time of the video stream 108. In some cases, the retrieval component 305 may obtain raw video data and chat activity 104 associated with an ongoing live broadcast of the video stream 108. Further, the retrieval component 305 may determine a measure of latency between the video stream 108 and the chat activity 104. The retrieval component 305 may then use the latency measure in syncing each chat message to the video stream 108. For instance, in practice, latency between a video stream 108 and chat activity 104 can often be up to ten seconds. By syncing the video stream 108 and the chat activity 104, the highlight generation tool 107 may identify highlight segments with better accuracy.

The chat messages may include a variety of message content. In addition to commentary of the video stream 108 itself, the chat activity 104 may include message content that may be extraneous. FIG. 2 depicts several examples. For instance, the chat activity 104 may include greetings between users, such as at 301. Other message content may include spam sent by chat bots, such as at 303. Such extraneous message content may affect the accuracy of the highlight generation tool 107 in identifying segments of interest to a viewer.

Referring again to FIG. 3, in one embodiment, the evaluation component 310 may preliminarily eliminate certain chat messages from consideration based on specified filters 312. The filters 312 may be specified by the streaming platform. Further, a stream owner may also specify filters 312. Examples include filters to remove greetings, spam messages, abusive language, or any other message content that may be irrelevant to the video stream 108. Filters 312 may also include rules for eliminating certain message content, e.g., deleting duplicate chat messages sent by a viewer within seconds of one another.

In one embodiment, the evaluation component 310 may also identify the chat activity 104 for specified context keywords 314. The context keywords 314 may include terms specific to a particular video stream 108, user associated with the video stream 108, content being presented within the video stream 108 (e.g., terms specific to a given video game). The evaluation component 310 may use the context keywords 314, for example, to override certain filters 312. Using FIG. 2 as an example, the message content at 302 ("hi egg hi") corresponds to a phrase use specifically for the game presented in the stream viewer 205. Although filters 312 might specify eliminating greetings from the chat activity 104, the evaluation component 310 may determine, based on context keywords 314, to prevent the phrase "hi egg hi" from being filtered from the chat activity 104. Doing so allows the highlight generation tool 107 to identify highlight segments more accurately.

In one embodiment, the correlation component 315 generally identifies segments of the video stream 108 that correspond to highlights for inclusion in one or more resulting highlight videos. The correlation component 315 evaluates the resulting chat activity 104 relative to the video stream 108. In particular, the correlation component 315 determines a threshold representing an expected level of chat activity at specified intervals of the video stream 108. In one embodiment, the threshold may correspond to an average rate of chat activity within specified time intervals (e.g., an average rate per every minute, every five minutes, every ten minutes, etc., of the video stream 108) throughout the video stream 108. As a result, this threshold may change at different segments of the video, e.g., reflecting possible increases or decreases of viewers that access the video stream 108 and contribute to the chat activity.

As another example approach, the correlation component 315 may determine the threshold via a step function using a viewer count and number of chat messages at a point in time across the video stream 108. For example, as a volume of viewers increases, the threshold may also increase proportional to the rise in viewers. Doing so allows the correlation component 315 to establish a point-in-time threshold, e.g., in situations where the video and chat activity data corresponding the video stream 108 is obtained in real-time (e.g., for a live stream).

Once a threshold is determined, portions in the chat activity 104 that exceed (or fall below) a corresponding threshold by a specified measure of variance (e.g., one or two units of standard deviation from the threshold) may correspond to events in the video stream 108 of potential interest to a viewer.

Further, in one embodiment, the correlation component 315 may plot a number of messages as data points relative to the running time of the video stream 108, represented as a two-dimensional graph. Doing so allows the correlation component 315 to identify sets of continuous points that exceed the threshold (or fall below the threshold) by a specified amount. The specified amount exceeded, for example, may be a standard of deviation of chat messages exceeding the threshold. Doing so also allows the correlation component 315 to identify peaks (or valleys) in each set of continuous points. A peak may represent a moment in the video stream 108 where a large amount of viewers of the video stream 108 collectively and distinctly react to some event. The peak may correspond to a highest point in the set of continuous points (or a valley may correspond to a lowest point, in cases where the chat activity falls significantly below the threshold).

Further, a certain amount of time preceding the peak may provide context for the unexpected level of chat activity. Further still, a certain amount of time following the peak may provide additional insight into viewer reactions in the chat activity. In one embodiment, the segmenting component 320 identifies sizes of these time windows associated with peaks based on chat activity patterns. To identify such patterns, the segmenting component 320 may determine curves (e.g., using some best-fit method) for the data points plotted in the graph of the number of chat messages over time.

An example pattern is anticipatory. An anticipatory pattern may represent instances where viewers expect a certain event to happen within the stream and comment about the event until about the moment where the event actually occurs. For instance, an anticipatory event may involve the stream owner setting up a play in-game and eventually executes that play with success. Discussion may gradually build up to the execution of the play and climax when the play is actually executed. Accordingly, a curve that corresponds to an anticipatory pattern may resemble a gradual build-up of chat messages over time, leading to the peak.

Another example pattern is reactive. A reactive pattern may represent instances where some unexpected event has occurred in the video stream 108, causing viewers to react upon this event occurring. For instance, a reactive event may involve the stream owner making a surprise play that catches an opponent off-guard in the game being streamed via the streaming platform. Typically, chat activity occurring immediately before such an event occurs may flow at or below the average rate. However, when the unexpected event occurs, chat activity may rise or spike significantly. Accordingly, a curve that corresponds to a reactive pattern may begin at a relative low point but undergo a sudden build-up or spike of chat messages that climax at the peak, with a gradual decrease of chat messages over time.

Of course, patterns can also include a hybrid of anticipatory and reactive events. For instance, a hybrid event may involve the stream owner setting up a play in-game, causing viewers to expect some event to occur as a result. However, during this set-up, some other unexpected event occurs, e.g., the opponent of the stream owner executes a surprise play. Chat activity in such an example may gradually build-up over time but spike when the unexpected event occurs. A curve depicting such a hybrid event may resemble a gradual build-up of chat messages with a sharp spike, with a gradual decrease of chat messages over time.

In one embodiment, the segmenting component 320 determines time windows for identified peaks (or valleys) based on associated curves. For example, if a given curve resembles an anticipatory pattern, the segmenting component 320 may determine that a time window begins several minutes prior to the point in time in the video stream 108 corresponding to a peak and ends shortly after the point of time corresponding to the peak. If a given curve resembles a reactive pattern, the segmenting component 320 may determine that a time window begins shortly prior to the point in time in the video stream 108 corresponding to the peak and ends several minutes following. For example, the beginning point of the time window may correspond to a moment in the video stream where chat activity is at a lowest point relative to the curve of the peak. The segmenting component 320 may determine the length of time prior to or following the peak based on where the curve begins or ends relative to the running time of the video stream 108.

In one embodiment, the output component 325 generates one or more stream highlights 109 based on the identified segments. For example, to do so, the output component 325 may extract video data corresponding to each of the time windows determined by the segmenting component 320 and concatenating the extracted video data into a single video file. In addition, the output component 325 may maintain separate video files for the stream highlights 109, each video file corresponding to one of the identified highlight segments. The output component 325 may store the stream highlights 109 in a data store and make the stream highlights 109 accessible by viewers (e.g., by publishing the highlights 109 for access the web portal application 116).

Further, prior to generating the highlight videos, the output component 325 may present the identified segments to the stream owner for approval, stream highlight selection, or further modification. Doing so allows the stream owner to review each of the identified highlight segments, and if desired, adjust the size of any of the time windows for the identified highlight segments. The output component 325 may generate the stream highlights 109 based on the specifications of the stream owner.

Further still, in one embodiment, the segmenting component 320 may refine time window determinations for subsequently analyzed video streams for a given stream owner based on manual adjustments received by the stream owner, e.g., using machine learning techniques. For example, the segmenting component 320 may build a machine learning model for the time windows that analyzes curves formed by the chat activity 104. The segmenting component 320 may then take adjustments to a given time window, as applied to a particular chat activity pattern, to either reinforce or realign the time window applied to that pattern. Refining the time window determinations may reduce the need for the stream owner to manually re-adjust a given time window for a generated highlight in subsequent video streams.

Figure 4:
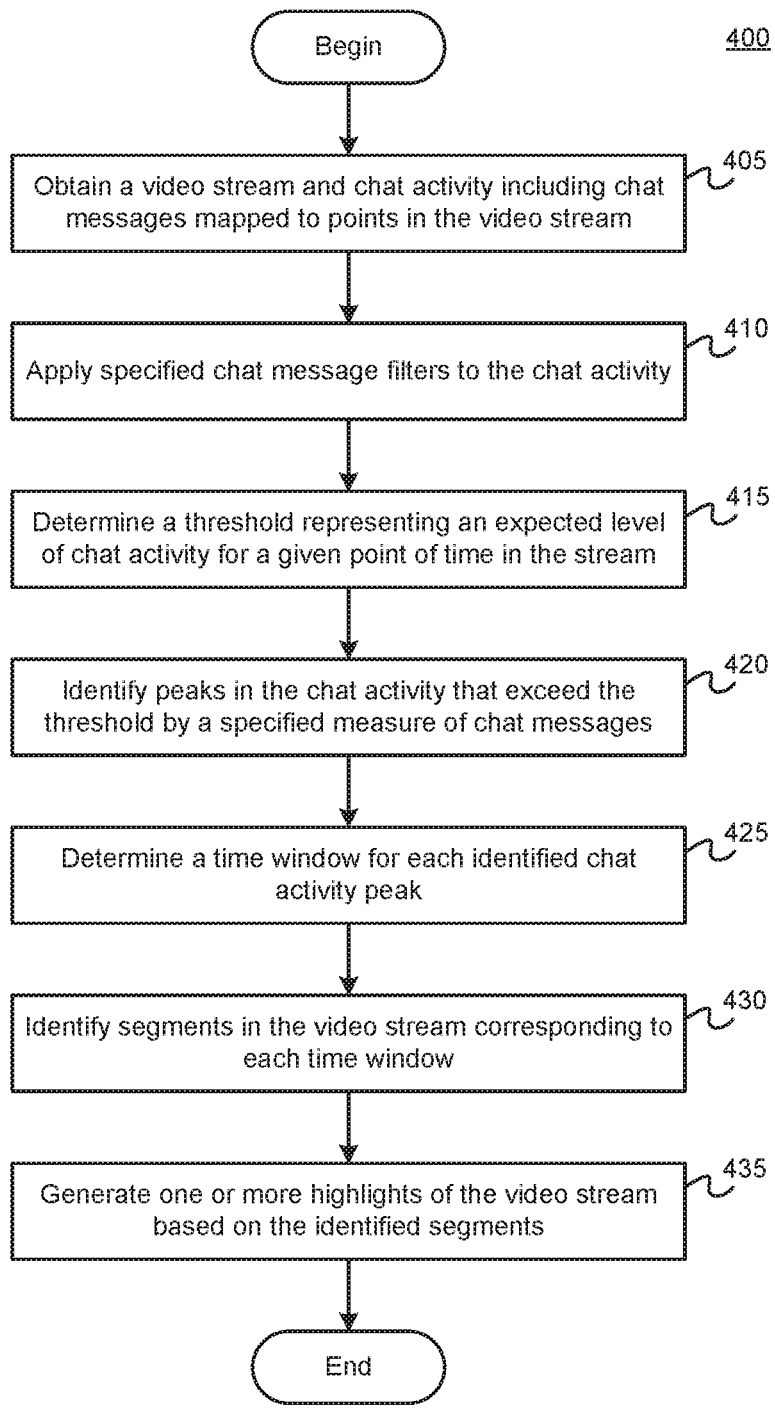
FIG. 4 illustrates a method for identifying highlight segments in a video stream, according to one embodiment.

FIG. 4 illustrates a method 400 for identifying highlight segments in a video stream, according to one embodiment. As shown, method 400 begins at step 405, where the retrieval component 305 obtains a video stream 108 and chat activity 104 from a data store on the streaming platform. The retrieval component 305 may do so upon request of a stream owner on the streaming platform to generate one or more stream highlights 109 from the video stream 108 and chat activity 104. As stated, the chat activity associated with the video stream includes chat messages distributed across different point in time in the video stream (e.g., based on timestamps on each chat message). The retrieval component 305 may also calculate latency between the video stream 108 and chat activity 104. The retrieval component 305 then syncs the video stream 108 with the chat activity 104 using the latency. Doing so provides a more accurate presentation of viewer reactions during a particular point in time of the video stream 108.

At step 410, the text evaluation component 310 may apply filters and context keywords 312 to the chat messages to eliminate messages including specified terms (or spam) from the chat activity. Doing so prevents chat messages that likely have no relevance to the video stream 108 from being factoring into the highlight generation tool 107 identifying a video segment as a highlight.

At step 415, the correlation component 315 determines a threshold representing an expected level of chat activity for a given point of time in the video stream 108. As stated, one approach for doing so includes the correlation component 315 determining an average rate of chat activity within specified time intervals, e.g., the average rate at every five minutes. Such an approach may be effective when applied to a completed video stream 108 having a known running length of time. Another approach for determining the threshold includes performing a step function based on a viewer count and number of chat messages at a given point in time. A step function provides a predictive approach that may be effective for a video stream 108 being broadcasted live.

Once determined, the correlation component 315 may identify data points in the video stream 108 that represent moments in the video stream 108 of potential interest to the viewer. Data points exceeding a specified variance from the threshold (e.g., a standard deviation exceeding the threshold) may represent moments in the video stream 108 that may be of interest to a viewer. Similarly, data points falling below another specified variance from the threshold (e.g., two standards of deviation falling below the threshold), may also represent moments of interest to a viewer. At step 420, the correlation component 315 identifies peaks (or valleys) of chat activity in each of the sets of continuous points exceeding (or falling below) the threshold by a specified measure. As stated, a peak may represent a moment in a potential highlight segment where the number of chat messages is the highest. A valley may represent a moment in a potential highlight segment where the number of chat messages is the lowest.

At step 425, the segmenting component 320 determines a time window for each identified chat activity peak or valley. To do so, the segmenting component 320 may analyze curves formed from chat activity patterns surrounding each identified peak or valley. For instance, the segmenting component 320 may assign time windows to a given peak based on whether the curve represents an anticipatory pattern or a reactive pattern (or some hybrid of anticipatory and reactive). Determining the time window sizes is further discussed relative to FIG. 6.

At step 430, the segmenting component 320 identifies segments in the video stream 108 corresponding to each determined time window. To do so, the segmenting component 320 may obtain time stamps associated with the beginning and end points of each time window. At step 435, the output component 435 generates one or more stream highlights 109 of the video stream 108 based on the identified segments. To do so, the output component 435 may extract the segments from the raw video file of the stream 108 using the time windows and concatenate each of the segments to form a single video file. In addition, the stream owner may also specify to the highlight generation tool 107 to generate separate video files each corresponding to a particular highlight segment.

Figure 5:
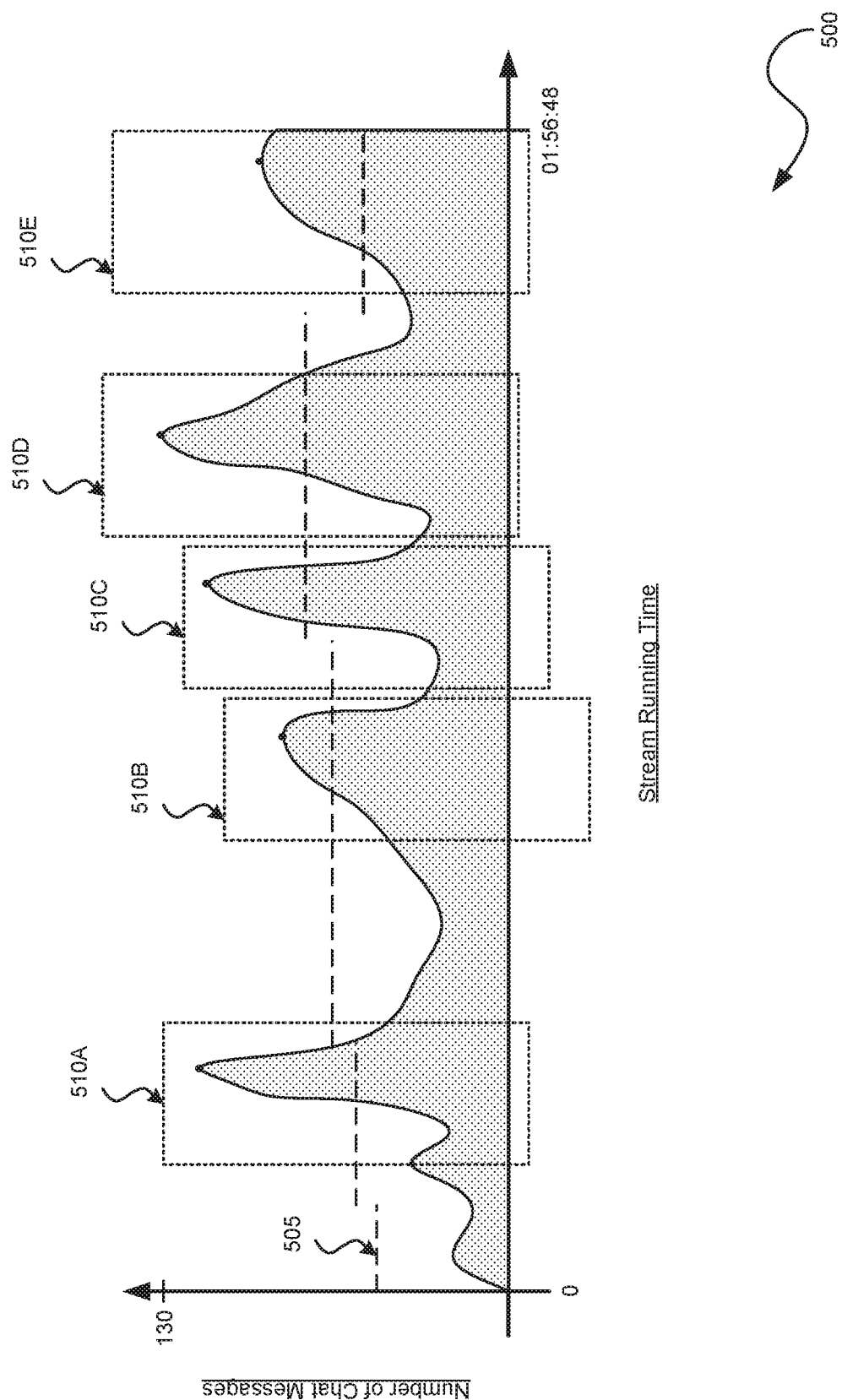
FIG. 5 illustrates an example of a graph representing chat activity over a running time of a video stream, according to one embodiment.

FIG. 5 illustrates an example of a graph 500 representing chat activity over a running time of a video stream, according to one embodiment. As stated, the number of chat messages in the chat activity may be plotted as data points in a graph over the running time in the video stream. The graph 500 presents the stream running time on the x-axis and the number of chat messages on the y-axis. Further, the correlation component 315 may determine a threshold 505 per specified time interval. Illustratively, the threshold 505 changes at regular intervals based on the level of chat activity during that interval of time.

Illustratively, graph 500 depicts continuous sets of data points that exceed the baseline threshold 505, at 510A, 510B, 510C, 510D, and 510E. Further, each of the sets of data points may resemble a certain pattern of chat activity. For instance, based on the sharp rise in chat messages within a relatively short amount of time, the data points within 510A may indicate a reactive pattern of activity. That is, the sudden rise in the chat messages compared to previous chat activity trends might be in response to some event occurring in the stream that is unexpected to viewers. In contrast, based on the steady rise in chat messages over a period of time, the data points within 510B may indicate an anticipatory pattern of activity. Such a gradual rise in the chat messages may indicate an expected event to occur, leading viewers to comment on the event as it is about to happen.

Figure 6:
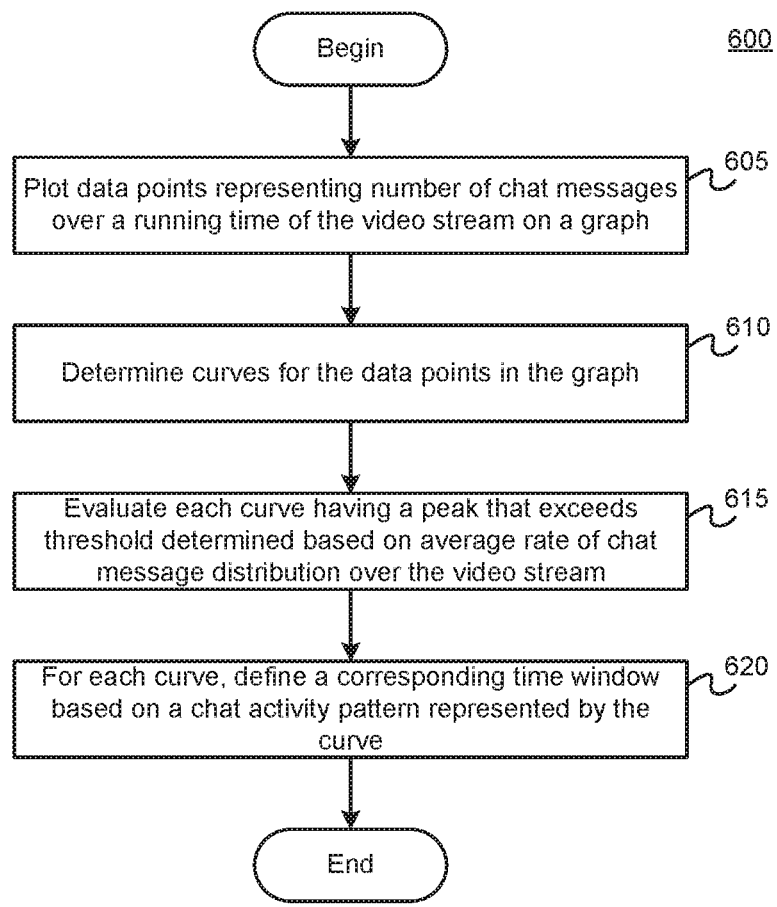
FIG. 6 illustrates a method for defining time windows for an identified highlight segment in a video stream, according to one embodiment

In either case, the segmenting component 315 may evaluate each of the data point sets relative to each peak in the sets (represented by a black dot in each of the data point sets 510A, 510B, 510C, 510D, and 510E) to determine time windows for each set. As stated, the segmenting component 315 may determine the time windows based on the chat activity patterns associated with the set (e.g., whether the pattern represents an anticipatory pattern, a reactive pattern, a hybrid of anticipatory and reactive, etc.). FIG. 6 illustrates a method 600 for defining time windows for an identified highlight segment in a video stream, according to one embodiment. As shown, method 600 begins at step 605, where the correlation component 315 plots data points representing a number of chat messages over a running time of the video stream on the graph (e.g., graph 500). In doing so, the correlation component 315 may also determine a threshold representing a baseline of expected chat activity for a point of time in the video stream.

At step 610, the correlation component 315 determines curves for data points in the graph. For example, the correlation component 315 may use curve fitting functions to do so. At step 615, the segmenting component 320 evaluates each curve that has a peak exceeding the threshold by a specified measure of variance. In particular, the segmenting component 320 evaluates the curve type for a given pattern.

At step 620, the segmenting component 320, for each identified curve, defines a time window based on the chat activity pattern represented by the curve. For instance, if the curve matches an anticipatory pattern, the segmenting component 320 determines a time window based on the anticipatory pattern of the curve. The segmenting component 320 may define the time window such that the corresponding highlight segment begins several minutes prior to the chat activity peak of the curve to depict the events occurring as the viewers begin to expect an event to occur. Further, the segmenting component 320 may define the time window to end shortly after the peak, e.g., thirty seconds after the peak, one minute after the peak, etc. The segmenting component 320 may also use the endpoints of the curve to determine the overall size of the time window.

If the curve matches a reactive pattern, the segmenting component 320 determines a time window based on the reactive pattern of the curve. For instance, the segmenting component 320 may define the time window such that the corresponding segment begins shortly before the chat activity peak of the curve, e.g., thirty seconds before the peak, fifteen seconds before the peak, etc. The segmenting component 320 may also define the time window to end several minutes following the peak.

As stated, in some cases, the curve may correspond to some hybrid of an anticipatory and a reactive pattern. In such a case, the segmenting component 320 may define the time window such that the window begins several minutes prior to the peak point (e.g., similar to the anticipatory pattern windows) and ends several minutes following the peak point.

Figure 7:
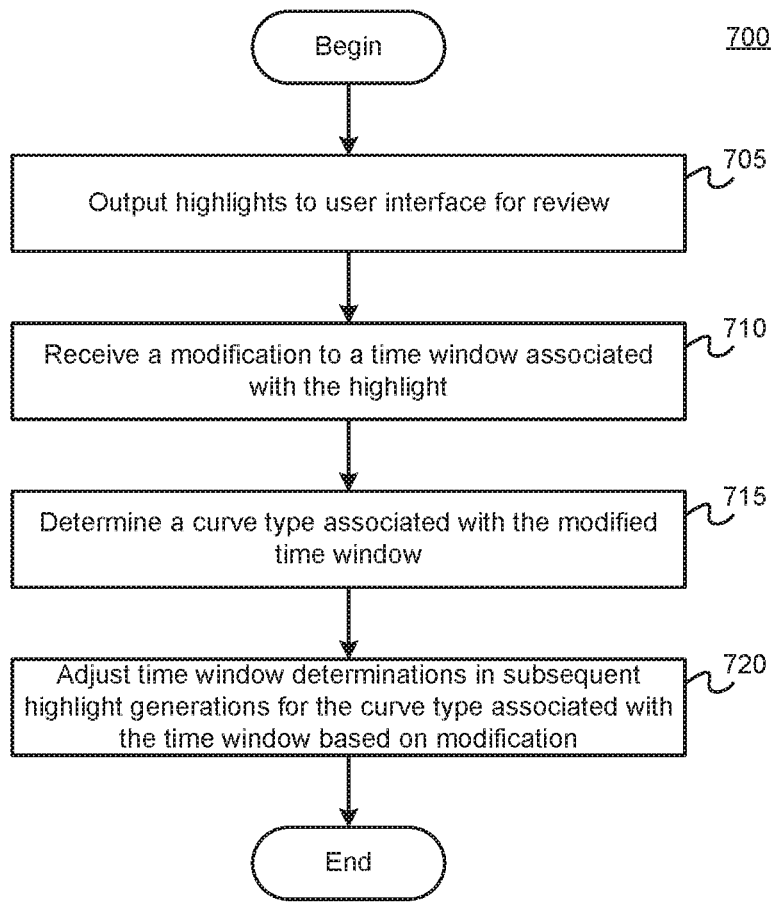
FIG. 7 illustrates a method for refining highlight determination based on stream owner feedback, according to one embodiment.

Of course, the time window determinations in the resulting stream highlights 109 may be further tuned by the stream owner. FIG. 7 illustrates a method 700 for refining highlight determination based on stream owner feedback, according to one embodiment. As shown, method 700 begins at step 705, where the output component 325 presents the identified highlight segments to a user interface (e.g., of the stream manager 111) for review by the stream owner. The stream owner, upon review of the highlight segments, may readjust the time windows, e.g., by moving time markers identifying a time window for the given segment.

At step 710, the segmenting component 320 receives a modification to a time window associated with the stream highlight 109. For example, the stream owner may review a stream highlight 109 that corresponds to an anticipatory event. The stream owner may adjust the stream highlight 109 to begin slightly longer prior to the peak moment than what was determined by the segmenting component 320. The segmenting component 320 receives this adjustment via stream manager 111. The segmenting component 320 may then modify the time window based on the adjustment.

At step 715, the segmenting component 320 determines a curve time associated with the modified time window. In this example, the segmenting component 320 determines that the time window is associated with an anticipatory curve. At step 720, the segmenting component 320 adjusts time window determinations in subsequent highlight generations for the curve type. As stated, the time window determinations may be formed based on a machine learning model. The segmenting component 320 may use the stream owner-specified modifications as input for updating the learning model. As a result, the segmenting component 320 may determine time windows based on the updated model.

Figure 8:
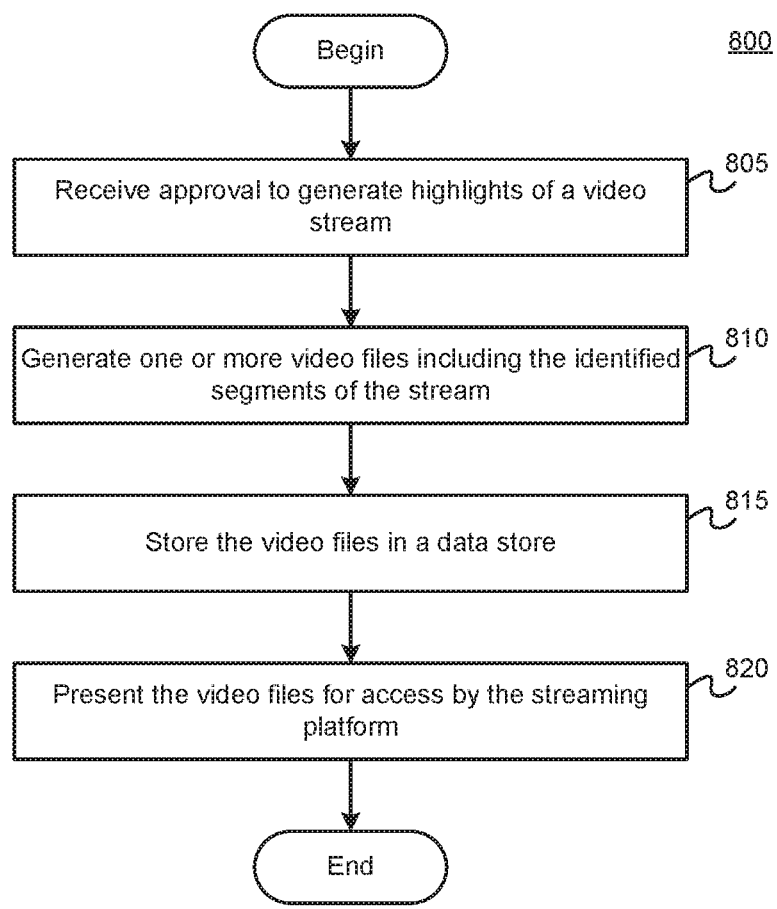
FIG. 8 illustrates a method for outputting highlight segments to a user interface, according to one embodiment.

FIG. 8 illustrates a method 800 for outputting highlight segments to the streaming platform, according to one embodiment. As stated, output component 325 may preview the identified segments corresponding to highlights of the video stream 108 to the stream owner for review. As shown, method 800 begins at step 805, where the output component 325 receives approval from the stream owner to generate one or more stream highlights from the video stream 108. The approval may also specify a selection of stream highlights 109 to generate, e.g., whether to generate a compilation of selected highlights, whether to generate separate videos each corresponding to a given highlight, whether to generate a single highlight video of all of the identified segments, etc.

At step 810, the output component 325 generates, based on the selection, one or more video files corresponding to the stream highlights 109. For instance, to do generate a video file for a given segment, the output component 325 may extract the segment by the corresponding time window for the segment. The output component 325 may also use a variety of codecs (e.g., H.264, etc.) for encoding the stream highlight 109.

At step 815, the output component 325 stores the generated stream highlights 109 in a data store maintained by the streaming platform. At step 820, the output component 325 publishes the video files for access by the streaming platform. For example, to do so, the output component 325 may send the generated stream highlights 109 to the CDN nodes, which, in turn, make the stream highlights 109 available to users on the streaming platform for viewing (e.g., via the web portal application 116). Alternatively, the output component 325 may store a file containing pointers to the identified time windows for a given video stream 108. Doing so allows the streaming platform to provide the stream highlights 109 without storing and loading separate video files.

Figure 9:
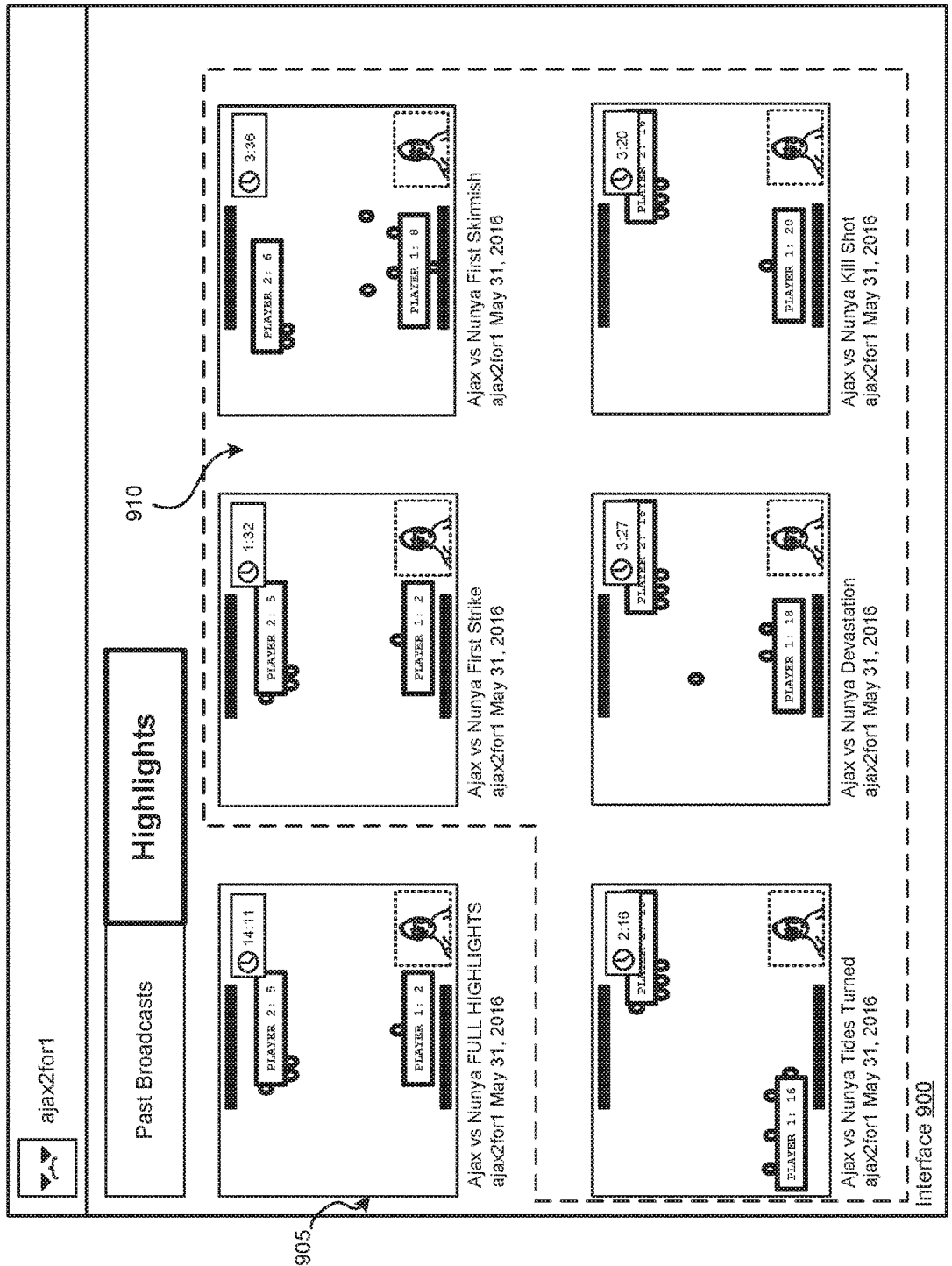
FIG. 9 illustrates an example display of highlight segments of a video stream in a user interface, according to one embodiment.

FIG. 9 illustrates an example interface 900 displaying highlight segments of a video stream 108, according to one embodiment. In particular, the interface 900 displays a profile of a stream owner that is accessible by a viewer of the streaming platform, e.g., using a web browser 121. Illustratively, the interface 900 presents the stream highlights 109 as selectable thumbnails that include descriptions under the thumbnails.

For example, thumbnail 905 represents a stream highlight 109 including a full compilation of the identified highlight segments of the video stream 108. As stated, the stream owner may also specify the highlight generation tool 107 to generate separate videos each including one of the identified highlights. Illustratively, the thumbnails 910 present multiple videos each corresponding to a given highlight.

Figure 10:
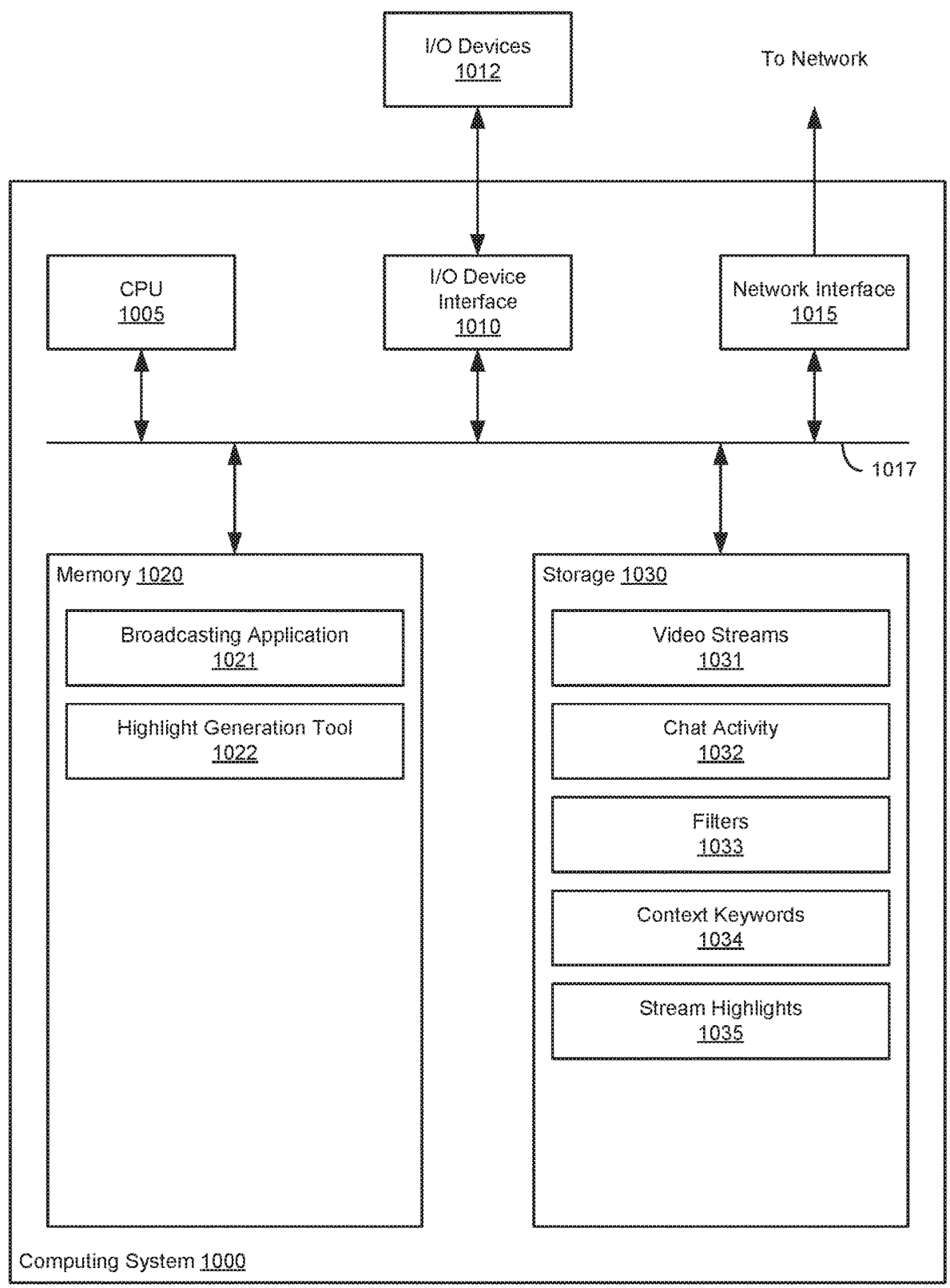
FIG. 10 illustrates an example computing system configured to identify highlight segments in a video stream, according to one embodiment.

FIG. 10 illustrates an example computing system 1000 configured to identify highlight segments in a video stream for a streaming platform, according to one embodiment. As shown, the computing system 1000 includes, without limitation, a central processing unit (CPU) 1005, a network interface 1015, a memory 1020, and storage 1030, each connected to a bus 1017. The computing system 1000 may also include I/O device interface 1010 connecting I/O devices 1012 (e.g., keyboard, display and mouse devices) to the computing system 1000. Further, in context of this disclosure, the computing elements shown in computing system 1000 may correspond to a physical computing system a laptop or desktop or a virtual computing instance executing within a computing cloud.

The CPU 1005 retrieves and executes programming instructions stored in the memory 1020 as well as stored in the storage 1030. The interconnect 1017 is used to transmit programming instructions and application data between the CPU 1005, I/O devices interface 1010, storage 1030, network interface 1015, and memory 1020. Note, CPU 1005 is included to be representative of a single CPU, multiple CPUs, a single CPU having multiple processing cores, and the like, and the memory 1020 is generally included to be representative of a random access memory. The storage 1030 may be a disk drive or flash storage device. Although shown as a single unit, the storage 1030 may be a combination of fixed and/or removable storage devices, such as fixed disc drives, removable memory cards, optical storage, network attached storage (NAS), or a storage area-network (SAN).

Illustratively, the memory 1020 includes a broadcasting application 1021 and a highlight generation tool 1022. The storage 1030 includes one or more video streams 1031, chat activity 1032 associated with each of the video streams 1031, filters 1033, context keywords 1034, and one or more stream highlights 1035. Generally, the broadcasting application 1021 ingests video data sent by a stream manager operated by a stream owner and streams the video data (as a video stream 1031) to viewers in the streaming platform. As described, the highlight generation tool 1022 identifies segments in a given video stream 1031 that are of potential interest to a viewer, based on a level of the chat activity 1032. The highlight generation tool 1022 may apply filters 1033 and context keywords 1034 to obtain a set of chat activity that the tool 1022 can use to measure levels of chat activity across the video stream 1031.

In particular, the highlight generation tool 1022 determines an average rate of chat messages per a specified time interval in the video stream 1031. The average rate provides threshold of expected chat activity across the video stream 1031. As stated, sets of continuous data points representing the number of chat messages over running time of the video stream 1031 may correspond to highlight segments of the video stream 1031 if the points exceed the threshold. The highlight generation tool 1022 may then evaluate chat activity patterns of these data points to determine time windows to associate with the highlight segments, such as whether the patterns correspond to anticipatory or reactive patterns. The highlight generation tool 1022 may then extract the segments at the time windows and create one or more stream highlights 1035 from the segments. The highlight generation tool 1022 may then make the stream highlights 1035 accessible to viewers of the streaming platform.

Note, the above descriptions of embodiments of the present disclosure have been presented for purposes of illustration, but are not intended to be limited to the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments may be devised without departing from the basic scope thereof, and the scope thereof is determined by the claims that follow.

What is claimed is:

1. A computer-readable storage medium storing instructions executable to perform an operation for identifying highlights in a video stream, the operation comprising:
   receiving a request to generate a highlight from the video stream, wherein the video stream is associated with a plurality of chat messages posted at different points in time during the video stream, the video stream depicting a scene;
   identifying, based on the plurality of chat messages, pertinent chat activity that excludes a chat message, of the plurality of chat messages, determined as being extraneous to the scene;

determining, based on evaluating the pertinent chat activity and for at least an interval of time relative to the video stream, a viewer activity threshold representing a specified variance from a baseline measure comprising an expected volume of pertinent chat activity for the video stream during the interval of time, wherein the expected volume is determined based on a viewer count of the video stream;

identifying peak chat activity characterized by the pertinent chat activity exceeding the viewer activity threshold, including identifying a chat activity curve;

identifying, based on the chat activity curve and by operation of a computer processor, a chat activity pattern from a plurality of chat activity patterns having curve types characterized by respective pre-peak and post-peak patterns; and generating the highlight by extracting a highlight segment of the video stream at a beginning point determined based on the pre-peak pattern of the chat activity pattern and at an end point determined based on the post-peak pattern of the chat activity pattern, wherein the highlight is output.

2. The computer-readable storage medium of claim 1, wherein the operation further comprises:
presenting a preview of the highlight of the video stream via a user interface, wherein the preview includes the beginning and end points;
receiving an adjustment to the beginning and end points; and
modifying the beginning and end points based on the adjustment.

3. The computer-readable storage medium of claim 2, wherein the operation further comprises:
updating a learning model for determining the beginning and end points based on the adjustment, wherein the learning model is used to refine determinations of the beginning and end points for at least a second video stream.

4. The computer-readable storage medium of claim 1, wherein the video stream is of a streaming platform that broadcasts video game activity over a network.

5. A system to identify events in a media stream, the system comprising:
a computer processor; and
a memory storing an applications that, when executed on the processor, performs an operation comprising:
obtaining the media stream and chat activity associated with the media stream, the media stream depicting a scene;
identifying, based on the chat activity, pertinent chat activity that excludes a message, of the chat activity, determined as being extraneous to the scene;
determining, for the media stream and based on evaluating the pertinent chat activity, a viewer activity threshold representing a specified variance from a baseline measure comprising an expected volume of pertinent chat activity for the media stream during a specified interval of time, wherein the expected volume is determined based on a viewer count of the media stream;
identifying peak chat activity characterized by the pertinent chat activity exceeding the viewer activity threshold, including identifying a chat activity curve;
identifying, based on the chat activity curve, a chat activity pattern from a plurality of chat activity patterns having curve types characterized by respective pre-peak and post-peak patterns; and
generating, based on the media stream, a highlight segment having (i) a starting point determined based on the pre-peak pattern of the chat activity pattern and (ii) an ending point determined based on the post-peak pattern of the chat activity pattern, wherein the highlight segment is output.

6. The system of claim 5, wherein the operation further comprises:
determining a measure of latency between the media stream and the chat activity; and
syncing the chat activity with the media stream based on the measure of latency.

7. The system of claim 5, wherein the chat activity comprises a plurality of chat messages logged during a live broadcast of the media stream.

8. The system of claim 5, wherein the operation further comprises:
presenting a plurality of highlight segments each corresponding to a respective one of the events via a user interface for approval;
receiving the approval for the events; and
publishing the plurality of highlight segments for viewing on a streaming platform.

9. The system of claim 5, wherein the viewer activity threshold is determined using a step function based on a viewer count and based further on a volume of chat activity during at least a first point in time of the media stream.

10. The system of claim 5, wherein the media stream is a completed broadcast of one of at least a video stream or an audio stream.

11. A computer-implemented method to identify highlight segments in a video stream, the computer-implemented method comprising:
obtaining the video stream, which depicts a scene;
obtaining chat activity pertinent to the scene, wherein the pertinent chat activity was identified by excluding a chat message as being extraneous to the scene;
plotting, in a chat activity graph and based on the pertinent chat activity, a volume of pertinent chat activity associated with the video stream over a running length of the video stream;
determining a viewer activity threshold based on a specified variance from a baseline measure comprising an average rate of chat messages per a specified time interval for the running length of the video stream, wherein the average rate is qualified by a viewer count of the video stream;
identifying peak chat activity characterized by the pertinent chat activity exceeding the viewer activity threshold, including identifying a chat activity curve in the chat activity graph;
identifying, based on the chat activity curve, a chat activity pattern from a plurality of chat activity patterns having curve types characterized by respective pre-peak and post-peak patterns; and
generating, based on the video stream and by operation of a computer processor, a highlight segment having (i) a starting point determined based on the pre-peak pattern of the chat activity pattern and (ii) an ending point determined based on the post-peak pattern of the chat activity pattern, wherein the highlight segment is output.

12. The computer-implemented method of claim 11, wherein the chat messages originate from users viewing the video stream during a live broadcast of the video stream.

13. The computer-implemented method of claim 11, wherein identifying the peak chat activity comprises:

determining, in the chat activity graph and for a set of continuous points that exceeds the viewer activity threshold, the chat activity curve to associate with the set;

identifying a chat activity peak in the chat activity curve, wherein the chat activity peak of the chat activity curve indicates a climax of viewer engagement of the video stream within the starting and ending points, wherein the chat activity pattern is identified as matching the chat activity curve.

14. The system of claim 5, wherein the application includes a highlight generation tool, the highlight generation tool comprising a plurality of components including a retrieval component, an evaluation component, a correlation component, a segmenting component, and an output component.

15. The system of claim 14, wherein the retrieval component is configured to obtain the media stream and the chat activity;

wherein the evaluation component is configured to identify the pertinent chat activity;

wherein the correlation component is configured to determine the viewer activity threshold;

wherein the segmenting component is configured to identify the pre-peak and post-peak patterns;

wherein the output component is configured to output the highlight segment.

16. The system of claim 15, wherein the chat activity comprises a plurality of chat messages logged during a live broadcast of the media stream, wherein the operation further comprises:

determining, by the retrieval component, a measure of latency between the media stream and the chat activity;

syncing the chat activity with the media stream based on the measure of latency;

presenting a preview of the highlight segment via a user interface;

responsive to receiving an adjustment to the starting and ending points of the highlight segment, modifying the starting and ending points based on the adjustment; and publishing the highlight segment for viewing on a streaming platform that broadcasts video game activity over a network.

17. The system of claim 16, wherein the viewer activity threshold is determined using a step function based on a viewer count and based further on a volume of chat activity during at least a first point in time of the media stream, wherein the media stream comprises a completed broadcast of one of at least a video stream or an audio stream, wherein the plurality of chat messages include context keywords associated with the media stream, wherein the media stream comprises the live broadcast;

wherein the media stream comprises a first media stream, wherein the operation further comprises updating a learning model for determining the starting and ending points based on the adjustment, wherein the learning model is used to refine determinations of the starting and ending points for at least a second media stream different from the first media stream;

wherein the baseline measure is determined based on an average rate of pertinent chat activity during the specified interval of time, wherein the chat activity originates from users viewing the first media stream during the live broadcast, wherein the chat activity peak of the chat activity curve indicates a climax of viewer engagement of the first media stream within the specified interval of time.

18. The system of claim 17, wherein the application is configured to determine an earlier point in time as being the starting point upon determining that the pre-peak pattern indicates an anticipatory pattern than when the pre-peak pattern indicates otherwise;

wherein the application is further configured to determine a later point in time as being the end point upon determining that the post-peak pattern indicates a reactive pattern than when the post-peak pattern indicates otherwise;

wherein the chat activity curve is determined using a curve fitting technique, wherein the chat activity pattern comprises, in respective instances:

(i) the anticipatory pattern, which has an anticipatory timespan type characterized by relatively earlier starting and ending points in order to isolate stream content corresponding to a relatively gradual rise followed by a relatively sudden fall in viewer activity;

(ii) the reactive pattern, which has a reactive timespan type characterized by relatively later starting and ending points in order to isolate stream content corresponding to a relatively sudden rise followed by a relatively gradual fall in viewer activity; and (iii) a hybrid pattern based on the anticipatory and reactive patterns, the hybrid pattern having a hybrid timespan type characterized by a relatively earlier starting point and a relatively later ending point in order to isolate stream content corresponding to a relatively gradual rise followed by a relatively gradual fall in viewer activity.

19. The computer-readable storage medium of claim 1, wherein the chat activity curve is determined using a curve fitting technique.

20. The computer-implemented method of claim 11, wherein the chat activity curve is determined using a curve fitting technique.

* * * * *